Patented Mar. 7, 1961

2,974,116

POLYESTERS EXTENDED WITH DIALLYLIDENE PENTAERYTHRITOL AND COMPOSITIONS CONTAINING SAME

John A. Parker, Lancaster Township, Lancaster County, Harold R. Ready, Manheim Township, Lancaster County, and John Versnel, Manor Township, Lancaster County, Pa., assignors to Armstrong Cork Company, Lancaster, Pa., a corporation of Pennsylvania No Drawing. Filed Apr. 16, 1957, Ser. No. 653,071

8 Claims. (Cl. 260—40)

This invention relates to resinous polymers, and more particularly to tough elastomeric polymers which are obtained by the reaction of diallylidene pentaerythritol and a polyester having certain characteristics.

The invention contemplates the reaction product of diallylidene pentaerythritol and a polyester having a number average molecular weight in the range of about 1,000–4,000. The polyester is the condensation product of saturated glycol, a saturated dicarboxylic acid containing 6–10 carbon atoms, and a dicarboxylic acid containing a single unsaturated bond and no more than 8 carbon atoms.

The diallylidene pentaerythritol to be used in the present invention has the formula

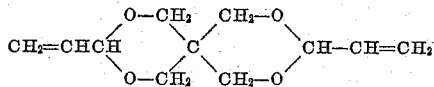

and may be more fully named as 3,9-divinyl-2,4,8,10-tetroxaspiro (5,5) undecane. This is the compound referred to when the term diallylidene pentaerythritol is used herein throughout the specification and claims.

The diallylidene pentaerythritol may be prepared by methods known in the art. The finely powdered pentaerythritol may be suspended in benzene and acrolein and suitable catalysts are added. As catalysts there may be used p-toluene-sulfonic acid or camphorous sulfonic acid. Two mols of acrolein are needed for every mol of pentaerythritol, although it is customary to add an excess of acrolein to drive the reaction toward completion. For example, with 4 mols of pentaerythritol, there may be used 9.3 mols of acrolein. The reaction is carried out at room temperature with vigorous stirring, after which the water formed by the reaction may be azeotropically distilled. The light yellow benzenic solution of the diacetal may contain small quantities of unreacted pentaerythritol in suspension. To the solution is added sufficient pyridine or piperidine to neutralize the catalyst, after which the solution may be filtered to remove undissolved pentaerythritol. The benzene may be removed by distillation either under normal pressure or under vacuum. Once the solvent has been removed, the diallylidene pentaerythritol distills in the form of a limpid colorless liquid at a temperature of between 142° and 143° C. under a pressure of 12 mm. of mercury and solidifies in the receiver in the form of long colorless matted needles of melting point of 41° to 42° C. Yields will generally run about 85% of theory.

The polyester utilized in the present invention is one having narrow and critical properties. It must possess a number average molecular weight in the range of about 1,000 to about 4,000, and preferably in the range of about 2,500 to 3,500. While essentially completely carboxyl or hydroxyl terminated polyesters may be used, preferred mixtures contain 10% to 25% carboxyl terminal groups and 90% to 75% hydroxyl terminal groups.

The polyester may be prepared from three classes of ingredients. The first ingredient will be a saturated glycol, as for example, 1,3-butylene glycol, 1,4-butylene glycol, diethylene, glycol, and 1,5-pentylene glycol. The second ingredient must be a saturated dibasic acid having a carbon chain of 6–10 carbon atoms, as for example adipic, sebacic, azelaic, methyl adipic acid, and the like. The third ingredient is a dicarboxylic acid or anhydride possessing a single unsaturated bond and having no more than 8 carbon atoms, as for example tetrahydrophthalic, maleic, fumaric, and similar acids and anhydrides. The relative amounts of saturated acid and unsaturated acid may be varied in accordance with the final product desired. The unsaturated acid incorporates in the polyester a reactive center which may be the site of a sulfur or peroxide cure in the finished elastomer. Accordingly, greater or less amounts of the unsaturated acid may be incorporated in the polyester according to the tightness of cure desired in the final product. For the purposes of utilizing the finished elastomeric product in a floor covering material, it has been found that the mole ratio of saturated acid to unsaturated acid will preferably be in the range of 1:1 to 6:1 at a molecular weight of the polyester of about 3,000. Where maleic acid is used as the unsaturated acid, it has been found that a saturated:unsaturated acid mole ratio of below 3:1 will produce side reactions yielding some gel. However, in many uses the presence of this gel in the polyester before reaction with the diallylidene pentaerythritol will not be objectionable.

The preparation of the polyester is carried out along the lines of known polyester technics. Preferably the glycol may be caused to react with the unsaturated acid at a temperature of about 90° C. Since the unsaturated acid may sublime very readily at higher temperatures, the mixture of glycol and unsaturated acid may be heated until the half ester of the unsaturated acid is formed. The end of the formation of the half ester can readily be seen by the disappearance of the white solid unsaturated acid from the solution, causing the solution to become homogeneous. Maleic anhydride reacts the fastest and usually requires about 5–10 minutes for the formation of the half ester. Tetrahydrophthalic anhydride and endomethylene tetrahydrophthalic anhydride react more slowly because they are less soluble in the glycol.

Once the half ester is formed, the unsaturated acid is more stable at elevated temperatures. Subsequent to the formation of the half ester of the unsaturated acid, the saturated dicarboxylic acid may be added and the temperature of the mixture may be increased to about 145° C.

During the addition of the unsaturated and saturated acids, an inert gas flow should be maintained through the reaction mixture to minimize side reactions that might occur in the presence of air. Most of the unsaturated acids used are sensitive to oxygen and the double bond oxidizes readily. This oxidation of the double bond might lead to cross linking of chains and subsequent formation of a gel, which may be an undesirable reaction at this point. The ease with which the oxidation occurs is dependent upon the unsaturated acid used. The ester containing maleic anhydride and endomethylene tetrahydrophthalic anhydride oxidizes more easily than one containing tetrahydrophthalic anhydride.

After holding the temperature at 145° C. for a suitable period of time, for example about 1 hour, the temperature may be increased slowly, for example to about 200° C. The time required for this increase of temperature is dependent upon the boiling point of the glycol used. If the boiling point of the glycol is below about 210° C., the time required would be on the order of 2–3 hours, while boiling points above about 210° C. allow a reduction of time to about 1 to about 1½ hours.

Where a predominantly hydroxyl terminated polyester is to be produced, the temperature should be held at about 200° C. until an acid number of about 30 is obtained. In the latter stages of polymerization where the acid number is below about 30 and the hydroxyl number is to be lowered further, the rate of decrease of the hydroxyl number may be dependent upon the rate of flow of carbon dioxide or other inert gas and upon the temperature of the polymer. In order to obtain a rapid decrease of the hydroxyl number in the latter stages of polymerization, the temperature of the polyester should be above the boiling point of the glycol used and the gas flow increased to such a rate that the volatile glycol is swept from the reaction mixture. Much the same technic will be used where a predominantly carboxyl terminated polyester is to be produced.

The end point of the polyester preparation will be reached when the polyester achieves a number average molecular weight of between about 1,000–4,000, and preferably of between about 2,500–3,500. These number average molecular weights are determined by means known in the art by determination of hydroxyl numbers and acid numbers of the polyester. Broadly speaking, the polyester will be obtained when the hydroxyl number is in the range of about 20–55 and the acid number is in the range of about 2–15, or for a carboxyl terminated polyester, when the hydroxyl number is in the range of about 2 to 15 and the acid number is in the range of about 20 to 55.

Extension of the above-described polyesters to rubbery polymers is accomplished by reaction of the polyesters with diallylidene pentaerythritol. Terminol hydroxyl and carboxyl groups of the polyester add across the reactive double bonds of the diallylidene pentaerythritol to give rubbery polymers. Secondary reactions involving ring opening occur to some extent producing cross links. Acids such as sulfuric acid, paratoluene sulfonic acid, aluminum chloride, boron trifluoride, and the like catalyze the extension reaction. The temperatures at which the extension reaction is to be carried out will vary generally from about 50° to about 200° C., although temperatures of about 80°–120° C. are preferred. Reaction times vary from about 1 to about 48 hours, depending on the temperature, with higher temperatures producing shorter reaction times. The proper amount of diallylidene pentaerythritol is simply weighed out and added to the polyester, whereupon the mixture is raised to the proper temperature with agitation and maintained under those conditions until reaction is complete. Completion of the reaction is indicated by no further change in the viscosity of the reaction product.

The amount of diallylidene pentaerythritol to be added to the polyester will vary generally between about 0.6 and about 1.6 on an equivalent basis. The molecular weight of the diallylidene pentaerythritol is 212 and one molecular weight of this compound is equal to two equivalent weights. The equivalent weight of the polyester will be determined in known manner from the hydroxyl and acid numbers. Where less than about 0.6 equivalent of diallylidene pentaerythritol per polyester equivalent is used, the resulting elastomer possesses insufficiently extended polyester chains to yield a tough product. Where greater than 1.6 equivalents of diallylidene pentaerythritol per polyester equivalent are used, the toughness of the resulting product again falls off. This latter result is apparently due to the side reactions that result from the opening of so many of the dioxane rings in the diallylidene pentaerythritol. Where the elastomeric product is to be used in a flooring composition, it is preferred that about 1.0–1.2 equivalents of diallylidene pentaerythritol per polyester equivalent be used.

The tough elastomer may be compounded with fillers, pigments, additional resins, and curing agents to form tough, strong, long-wearing flooring materials. Particularly useful is a composition comprising the elastomers described above and a vinyl chloride polymer such as polyvinyl chloride and vinyl chloride-vinyl acetate copolymers. In such compositions the filler generally comprises about 40%–75% by weight of the total composition. The fillers will generally be inorganic fillers such as slate flour, the clays or earths, finely divided calcium carbonate, and titanium dioxide which serves also as a pigmenting agent. In such a composition, the binder would be a mixture of vinyl chloride polymer and elastomers formed as described earlier. Of the binder portion of the flooring composition, the vinyl chloride polymer may make up 10%–80% by weight of the binder system and the diallylidene pentaerythritol-polyester reaction product will make up 90%–20% by weight. Where the unsaturated acid present in the elastomer is tetrahydrophthalic anhydride or endomethylene tetrahydrophthalic anhydride, a sulfur-containing curing system may be used. Where the unsaturated dicarboxylic acid is maleic anhydride, a peroxide curing system such as dicumyl peroxide may be used.

The vinyl chloride polymer, the elastomer, fillers, pigments, and plasticizer, if any, will be mixed on a mill or internal mixer. The curing system will be added and the final mixture will be sheeted out on a mill to form a sheet having the desired dimensions; a thickness in the range of about 0.030–0.125 inch is preferred. The sheet will often be affixed to a backing of a suitable felted material such as is commonly used in the flooring industry prior to cure. Alternatively, this sheet may be cut into flooring tile after cure.

The following examples illustrate several embodiments of the invention. All parts are by weight unless otherwise stated.

*Example I*

A polyester is prepared by esterifying 1,4-butylene glycol with a mixture of adipic acid and tetrahydrophthalic anhydride. The molar ratio of the saturated acid to the unsaturated acid was 2:1. An excess of the glycol was used in an amount of 19% mole excess to make up for the tetrahydrofurane formed as a side product from the glycol. The resulting polyester had a number average molecular weight of 3,240, a hydroxyl number of 31.0, and an acid number of 3.6.

A sealed jar containing 162.0 parts of the polyester, 12.8 parts diallylidene pentaerythritol, and 0.9 part p-toluene sulfonic acid was tumbled in a 90° C. oil bath for 16 hours. A tough, tacky elastomer was obtained.

*Example II*

The polyester described in Example I was admixed in an amount of 162.0 parts with 12.9 parts diallylidene pentaerythritol and 0.55 part p-toluene sulfonic acid and then allowed to stand at 120° C. for 24 hours. The product was a very viscous liquid at 120° C. and was a tacky, tough rubber at room temperature.

*Example III*

The polyester of Example I was thoroughly mixed in an amount of 162.0 parts with 14.8 parts diallylidene pentaerythritol and 0.55 part p-toluene sulfonic acid and allowed to stand at 120° C. for 24 hours. The product was a tough, tacky rubber.

*Example IV*

A polyester was prepared from the same reactants as the polyester of Example I. This polyester possessed a number average molecular weight of 2,560, a hydroxyl number of 36.4, and an acid number of 7.4. Into a resin pot was placed 128 parts of the polyester, 33 parts of a diallylidene pentaerythritol reaction mixture stripped to about 45% by weight diallylidene pentaerythritol in benzene, and 0.7 part p-toluene sulfonic acid. The product was heated to 120° C., stripped with nitrogen for 1 hour, and held at that temperature for 20 hours. A tough rubber was formed.

Example V

A polyester was formed from 1,4-butylene glycol, and a mixture of adipic acid and maleic anhydride; the adipic acid:maleic anhydride molar ratio was 3:1. An excess of glycol was again used. The polyester had a number average molecular weight of 2,840, a hydroxyl number of 33.6, and an acid number of 5.9. A mixture of 142 parts polyester, 12.9 parts diallylidene pentaerythritol, 0.1 part hydroquinone, and 0.5 part p-toluene sulfonic acid was heated at 120° C. with stirring in a nitrogen atmosphere for 1.5 hours. Although the rubber became sufficiently thick to prevent stirring, heating was continued for a total of 3.25 hours. After cooling, the product was removed as a hard, tough rubber.

Example VI

The ingredients of Example V were stirred at 120° C. in a nitrogen atmosphere. After 2 hours a rubbery polymer was obtained.

Example VII

The ingredients of Example V were stirred under nitrogen for 30 minutes at 120° C. The product was then transferred to a 120° C. oven for 2 hours. A tough rubber was obtained.

Example VIII

A rubber was obtained by heating and stirring 284 parts of the polyester of Example V, 25.8 parts diallylidene pentaerythritol, and 1.0 part p-toluene sulfonic acid for 30 minutes under nitrogen. After heating an additional 2.5 hours under nitrogen, the product was removed as a tough rubber.

Example IX

A polyester was prepared from 1,3-butylene glycol and an adipic-maleic acid mixture of 3–1 molar ratio. The polyester had a number average molecular weight of 2,360, a hydroxyl number of 40.6, and an acid number of 6.8. A mixture of 118 parts of the polyester and 12.9 parts diallylidene pentaerythritol was heated at 120°–130° C. for 3 hours with 0.3% by weight p-toluene sulfonic acid.

A filter was prepared having the following composition:

| | Percent |
|---|---|
| Iceberg clay | 29.4 |
| Precipitated calcium carbonate | 9.7 |
| Calcium carbonate (whiting) | 46.8 |
| Titanium dioxide | 14.1 |

Onto a cold mill was placed a composition containing 31% by weight of the elastomer, 68% by weight of the filler system, and 1% by weight dicumyl peroxide. The sheeted mixture was taken off the mill and cured for 0.1 hour at 320° F. under a total pressure of 40,000 pounds.

The tensile strength of the cured sheet was 2,100 pounds per square inch, and the elongation was 7%.

Example X

A polyester was prepared from 1,4-butylene glycol (19 mole percent excess) and an adipic acid-maleic anhydride mixture in a 3:1 molar ratio. The number average molecular weight of the resulting polyester was 2,880, the hydroxyl number was 32.8, and the acid number was 6.1.

A mixture of 144 parts of the polyester and 0.35 part concentrated sulfuric acid was heated at 100° C. for 1 hour and then treated with 10.6 parts diallylidene pentaerythritol. The resulting rubber was removed after 2 hours.

The product was sheeted out from a cold mill in the following formulation:

| | Percent |
|---|---|
| Rubbery elastomer | 18.5 |
| Polyvinyl chloride (Geon 126) | 12.3 |
| Hydrous aluminum silicate clay | 23.0 |
| Calcium carbonate (whiting) | 45.2 |
| Dicumyl peroxide | 1.0 |

The goods were pressed at 320° F. for 6 minutes at 40,000 pounds. The resulting sheet had a tensile strength of 1,818 pounds per square inch with an ultimate elongation of 9.2%.

Example XI

A series of flooring compositions in sheet form was prepared with varying ingredients and under various conditions. The following table illustrates the results. The abbreviations "MD" and "AMD" used in the table stand for "machine direction" and "across machine direction," respectively, and refer to the sheet-forming machine.

FLOOR COMPOSITIONS FROM DIALLYLIDENE PENTAERYTHRITOL-EXTENDED POLYESTER BINDER SYSTEMS

| Rubber Example | Percent Binder (a) | Curing System (b) | | Curing Conditions | Tensile Strength, #/in.² (c) | | Elongation, Percent | 10% Modulus | Hardness, Shore D | Indentation, Percent (d) | Residual Indentation, Percent (e) |
|---|---|---|---|---|---|---|---|---|---|---|---|
| | | Sulfur | Peroxide | | MD | AMD | | | | | |
| 1 | 36 | x | | 1 hr. at 320° F./40,000# | 880 | | 48.5 | 579 | 55 | 50.2 | 9.5 |
| 1 | 36 | x | | 8 hrs. at 120° C | | 969 | 52.7 | 559 | | 37.5 | 4.1 |
| 2 | 31 | x | | 16 hrs. at 120° C | 1,112 | 1,000 | 31.1 | 610 | | 29.9 | 3.6 |
| 3 | 31 | x | | 16 hrs. at 120° C | 1,252 | 1,132 | 35.2 | 692 | | 28.1 | 2.8 |
| 4 | 31 | x | | 24 hrs. at 120° C | 1,006 | 913 | 21.0 | 773 | | 31.5 | 3.2 |
| 5 | f 33 | | x | 0.1 hr. at 320° F./40,000# | 1,497 | | 25.4 | 990 | 66 | 20.0 | 1.7 |
| 5 | f 33 | | x | 1 hr. at 150° C | 1,905 | 1,613 | 16.5 | 1,360 | | | |
| 6 | f 33 | | x | 0.1 hr. at 320° F./40,000# | 1,866 | | 6.9 | | | | |
| 6 | f 33 | | x | 1 hr. at 150° C | 2,113 | 1,958 | 10.2 | 1,950 | | 9.5 | 0 |
| 7 | f 33 | | x | 1 hr. at 150° C | 1,425 | 1,154 | 17.1 | 1,004 | | 23.3 | 3.6 |
| 8 | f 33 | | x | 0.1 hr. at 320° F./40,000# | 1,241 | | 18.0 | 897 | 67 | 22.9 | 1.6 |
| 8 | f 33 | | x | 1 hr. at 150° C | 1,409 | 1,381 | 14.2 | 1,212 | | 23.3 | 2.1 | a Binder consists of 60 wt. percent polyester rubber and 40 wt. percent polyvinyl chloride (Geon 126). The balance of the composition is filler.
b Sulfur: 2.25 wt. percent of total charge consisting of 14.4% sulfur, 19.3% mercaptobenzothiazole, 1.0% copper dimethyl dithiocarbamate, 19.3% alkyl-phenol-sulfide, 35.0% zinc oxide, and 11.0% stearic acid. Peroxide: 0.32 wt. percent dicumyl peroxide.
c 6"/min. jaw speed, 4" jaw separation, ½ x 6" specimen.
d 0.178" tip, 150 lbs., 30 seconds.
e 0.125" tip, 8 oz., 15 minutes after (d).
f 31% rubber-polyvinyl chloride mixture plus 2% tricresyl phosphate.

We claim:
1. The elastomeric reaction product of 0.6–1.6 equivalents of diallylidene pentaerythritol per each equivalent of a polyester having a number average molecular weight in the range of about 1,000–4,000 and having a hydroxyl number in the range of about 20–55 and an acid number in the range of about 2–15, and when said polyester is a carboxyl terminated polyester, having a hydroxyl number in the range of about 2 to 15 and an acid num- ber in the range of about 20 to 55, said polyester being the condensation product of a saturated glycol selected from the group consisting of 1,3-butylene glycol, 1,4-butylene glycol, diethylene glycol, and 1,5-pentalene glycol, a saturated dicarboxylic acid containing 6–10 carbon atoms selected from the group consisting of adipic, sebacic, azelaic, and methyl adipic acids, and a dicarboxylic acid containing a single unsaturated bond and no more than 8 carbon atoms, said saturated acid and unsaturated acid being present in a mole ratio in the range of 1:1 to 6:1.

2. A product according to claim 1 wherein said number average molecular weight is in the range of about 2,500–3,500.

3. A flooring composition comprising 20%–60% by weight binder and about 80%–40% by weight inorganic mineral filler and pigments, said binder comprising at least about 20% by weight of the elastomeric reaction product of claim 1, the balance being a vinyl chloride polymer selected from the group consisting of polyvinyl chloride and vinyl chloride-vinyl acetate copolymers.

4. A flooring composition comprising 20%–60% by weight binder and about 80%–40% by weight inorganic mineral filler and pigments wherein said binder comprises 20–90% by weight of the elastomeric reaction product of claim 1 and 10–80% by weight of a vinyl chloride polymer selected from the group consisting of polyvinyl chloride and vinyl chloride-vinyl acetate copolymers.

5. A flooring composition comprising binder and 40–75% by weight of said composition of inorganic mineral fillers and pigments wherein said binder comprises 10–80% by weight vinyl chloride polymer selected from the group consisting of polyvinyl chloride and vinyl chloride-vinyl acetate copolymers, and 90–20% by weight rubbery elastomeric reaction product of 0.6–1.6 equivalents of diallylidene pentaerythritol per each equivalent of a polyester having a number average molecular weight in the range of about 1,000–4,000 and having a hydroxyl number in the range of about 20–55 and an acid number in the range of about 2–15, and when said polyester is a carboxyl terminated polyester, having a hydroxyl number in the range of about 2 to 15 and an acid number in the range of about 20 to 55, said polyester being the condensation product of adipic acid, tetrahydrophthalic anhydride, and a saturated glycol selected from the group consisting of 1,3-butylene glycol, 1,4-butylene glycol, diethylene glycol, and 1,5-pentalene glycol, said adipic acid and said tetrahydrophthalic anhydride being present in a mole ratio in the range of 1:1 to 6:1.

6. A composition according to claim 5 wherein said polyester has a number average molecular weight in the range of about 2,500–3,500.

7. A flooring composition comprising binder and 40–75% by weight inorganic mineral filler and pigments wherein said binder comprises 10–80% by weight vinyl chloride polymers selected from the group consisting of polyvinyl chloride and vinyl chloride-vinyl acetate copolymers, and 90–20% by weight rubbery elastomeric reaction product of 0.6–1.6 equivalents of diallylidene pentaerythritol per each equivalent of a polyester having a number average molecular weight in the range of about 1,000–4,000 and having a hydroxyl number in the range of about 20–55 and an acid number in the range of about 2–15, and when said polyester is a carboxyl terminated polyester, having a hydroxyl number in the range of about 2 to 15 and an acid number in the range of about 20 to 55, said polyester being the condensation product of adipic acid, maleic anhydride, and a saturated glycol selected from the group consisting of 1,3-butylene glycol, 1,4-butylene glycol, diethylene glycol, and 1,5-pentalene glycol, said adipic acid and maleic anhydride being present in a mole ratio in the range of 1:1 to 6:1.

8. A composition according to claim 7 wherein said number average molecular weight is in the range of about 2,500–3,500.

References Cited in the file of this patent

UNITED STATES PATENTS

| | | |
|---|---|---|
| 2,555,062 | Small et al. | May 29, 1951 |
| 2,593,787 | Parker | Apr. 22, 1952 |
| 2,652,383 | Davis | Sept. 15, 1953 |

OTHER REFERENCES

Angewandte Chemie, No. 62, March 1950, pages 113–118.

"Polyester," Reinhold Publishing Corp., New York, New York, March 1956, pages 163–170.